US012755620B2

(12) United States Patent
Beatty

(10) Patent No.: US 12,755,620 B2
(45) Date of Patent: Oct. 6, 2026

(54) SYSTEM AND METHOD OF VISUAL DETECTION OF GROUP MULTI-SENSOR GATEWAY TRAVERSALS USING A STEREO CAMERA

(71) Applicant: Xtract One Technologies Inc., Toronto (CA)

(72) Inventor: Timothy Frederic Beatty, Fredericton (CA)

(73) Assignee: XTRACT ONE TECHNOLOGIES INC.

( * ) Notice: Subject to any disclaimer, the term of this patent is extended or adjusted under 35 U.S.C. 154(b) by 131 days.

(21) Appl. No.: 18/325,158

(22) Filed: May 30, 2023

(65) Prior Publication Data

US 2023/0386309 A1 Nov. 30, 2023

Related U.S. Application Data

(60) Provisional application No. 63/346,945, filed on May 30, 2022.

(51) Int. Cl.
*G08B 13/196* (2006.01)
*G06V 20/52* (2022.01)

(52) U.S. Cl.
CPC ....... *G08B 13/19602* (2013.01); *G06V 20/52* (2022.01)

(58) Field of Classification Search
None
See application file for complete search history.

(56) References Cited

U.S. PATENT DOCUMENTS

| | | | | |
|---|---|---|---|---|
| 2018/0268674 A1* | 9/2018 | Siminoff | ................ | H04N 7/186 |
| 2021/0287013 A1* | 9/2021 | Carter | ...................... | G06F 18/24 |
| 2023/0230294 A1* | 7/2023 | Nagai | .................. | G06V 40/103 |

* cited by examiner

*Primary Examiner* — Xiaolan Xu

(57) ABSTRACT

A system and method of visual detection for a multi-sensor gateway using a stereo camera system. The system consists of two pillars and a stereo camera that build a gateway for patrons to pass through. Threat detection relies on artificial intelligence to analyze the sensors' data and assess the presence of a threat. The AI is performed on an edge device contained within the gateway. The gateway can consist of a number of peripherals that enhance the sensing capability of the gateway, such as a camera, or an accelerometer; or provide the security guard with information around alerts and threat locations such as with displays or audible alerts or manage the operations such as displays to control throughput.

12 Claims, 16 Drawing Sheets

FIG. 1C
Alaska
AIRLINES ATRIUM
PatriotOne

```
Average Precision  (AP) @[ IoU=0.50:0.95 | area=   all | maxDets=100 ] = 0.894
Average Precision  (AP) @[ IoU=0.50      | area=   all | maxDets=100 ] = 0.997
Average Precision  (AP) @[ IoU=0.75      | area=   all | maxDets=100 ] = 0.950
Average Precision  (AP) @[ IoU=0.50:0.95 | area= small | maxDets=100 ] = -1.000
Average Precision  (AP) @[ IoU=0.50:0.95 | area=medium | maxDets=100 ] = -1.000
Average Precision  (AP) @[ IoU=0.50:0.95 | area= large | maxDets=100 ] = 0.894
Average Recall     (AR) @[ IoU=0.50:0.95 | area=   all | maxDets=  1 ] = 0.440
Average Recall     (AR) @[ IoU=0.50:0.95 | area=   all | maxDets= 10 ] = 0.910
Average Recall     (AR) @[ IoU=0.50:0.95 | area=   all | maxDets=100 ] = 0.915
Average Recall     (AR) @[ IoU=0.50:0.95 | area= small | maxDets=100 ] = -1.000
Average Recall     (AR) @[ IoU=0.50:0.95 | area=medium | maxDets=100 ] = -1.000
Average Recall     (AR) @[ IoU=0.50:0.95 | area= large | maxDets=100 ] = 0.915
```

FIG. 7

SYSTEM AND METHOD OF VISUAL DETECTION OF GROUP MULTI-SENSOR GATEWAY TRAVERSALS USING A STEREO CAMERA

CROSS REFERENCE TO RELATED APPLICATIONS

The application claims priority to and the benefit of U.S. Provisional Application Ser. No. 63/346,945, entitled "SYSTEM AND METHOD VISUAL DETECTION FOR A MULTI-SENSOR GATEWAY USING A STEREO CAMERA", filed on May 30, 2022, the disclosure of which is incorporated herein by reference in its entirety.

BACKGROUND

The embodiments described herein relate to security and surveillance, in particular, technologies related to video recognition threat detection.

The Multi-Sensor Gateway (MSG) system offered by Xtract One provides a means of screening venue patrons for various types of dangerous objects including guns, knives, batons, and other weapons. It consists of a pair of opposing gates, spaced approximately 1-2 metres apart, between which patrons are intended to pass through on an individual basis.

Screening for dangerous objects is accomplished by a machine learning (ML) model that is provided input from various onboard sensors as patrons pass through the gates. In order for the screening process to be effective, it is necessary for patrons to pass through the gates at a rate of no greater than approximately one patron every 1.5 seconds. When this requirement is contravened, screening performance is significantly inhibited. A physical queuing system to ensure adherence to operational protocols cannot, however, be put in place due to the potential of creating a negative patron experience during the initial entry into a venue.

Past experience in trial deployments has demonstrated that a means of verifying nominal system performance is necessary in order to identify deficiencies in operational processes. Initial efforts have approached this problem as a post-hoc analysis task and have been impactful in improving customer success outcomes.

Identification of non-adherence to throughput requirements was attempted and resulted in a proof-of-concept project capable of estimating counts of problematic gate traversals from a single detached monocular camera. While this effort was successful in demonstrating a visual approach to the problem, it has a few key limitations:

- identification of the gate traversal plane is cumbersome.
- spatial judgments are made from 2D imagery lacking spatial context.

To address the limitations of previous efforts, a subsequent iteration has been undertaken that incorporates automated gate traversal plane identification as well as enhanced spatial awareness through the use of a stereo camera. The result of this effort demonstrates that identification of improper gate traversal can be done conveniently and with high quality, while also providing a compelling visual experience.

SUMMARY

A system and method of visual detection for a multi-sensor gateway using a stereo camera system. The system consists of two pillars and a stereo camera that build a gateway for patrons to pass through. Threat detection relies on artificial intelligence to analyze the sensors' data and assess the presence of a threat. The AI is performed on an edge device contained within the gateway. The gateway can consist of a number of peripherals that enhance the sensing capability of the gateway, such as a camera, or an accelerometer; or provide the security guard with information around alerts and threat locations such as with displays or audible alerts or manage the operations such as displays to control throughput.

BRIEF DESCRIPTION OF THE DRAWINGS

FIG. 7 is a diagram illustrating an exemplary performance metrics dataset.

DETAILED DESCRIPTION

Embodiments of this disclosure includes a system that places the computing at the edge by including an onboard processor. Further, different peripherals are added to present the alert information to the security guard, as well as control the throughput rate and operations. This system benefits the patron experience and provides added value to the customer in terms of managing throughput and enhancing security.

Figure 1A:
FIGS. 1A to 1C are diagrams illustrating operation of multi-sensor gateway (MSG) system.
Figure 1B:
Figure 1C:

FIGS. 1A to 1C are diagrams illustrating operation of a multi-sensor gateway (MSG) system. FIG. 1A illustrates an exemplary MSG installed at the entrance of an office building. FIG. 1B is a further diagram of a MSG showing people going through the MSG for screening. FIG. 1C is a further diagram of a MSG placed at the entrance of an airport.

Figure 2:
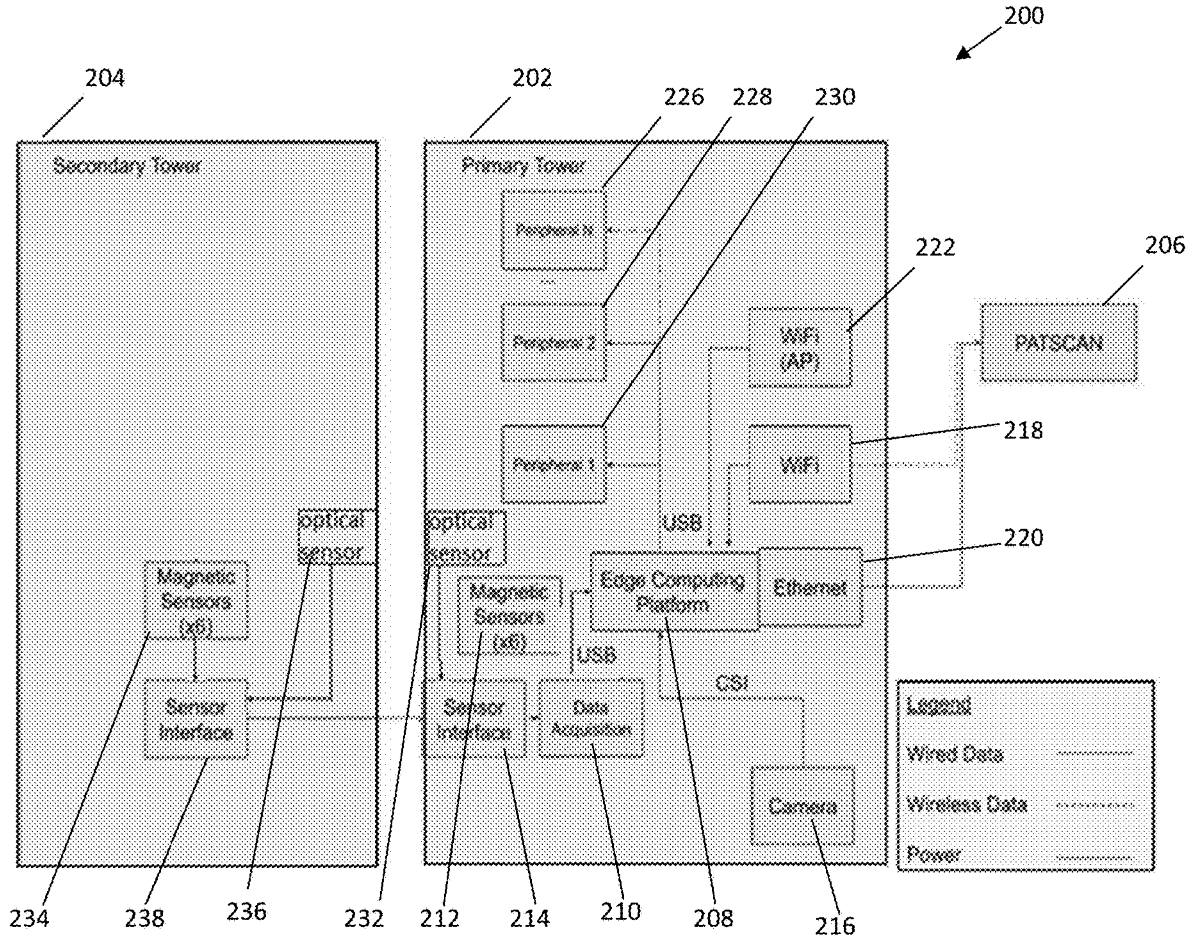
FIG. 2 is a block diagram illustrating a gateway detection system.

FIG. 2 is a block diagram illustrating a gateway detection system. According to FIG. 2, the gateway detection system 200 consists of a primary tower 202, a secondary tower 204 and a threat detection system such as PATSCAN 206, connected to each other either through a wired or wireless connection. The primary tower 202 consists of the main components of the system including an Edge computing platform 208, data acquisition unit 210, multiple magnetic sensors 212, sensor interfaces 214, one or more cameras 214, a Wi-Fi® module 218 and Ethernet module 220 for connectivity, Wi-Fi® access point 222 and connections to multiple peripherals 226, 228 and 230. The peripherals include optical sensors 232, camera(s), display(s), light(s), speaker(s), accelerometer, Wi-Fi® and Bluetooth units. The secondary tower 204 includes multipole magnetic sensors 234, optical sensor 236 and sensor interface 238 and is connected to the primary tower by a wired data link (e.g., Ethernet). In further embodiments, a wireless connection such as Wi-Fi®, Bluetooth®, IRDA, cellular or other wireless connectivity mediums may be supported.

According to the disclosure, a multi-sensor threat detection system may contain an onboard processor (e.g., Nvidia Jetson) that performs the artificial intelligence (AI) to detect the presence of a threat. This removes the need for network dependence on the deployment facility, thereby strongly facilitating the deployment. The onboard processor also reduces the latency of alert, when compared to performing the AI on a server. This results in a smoother screening experience, as the alert latency can handle the high throughput rates. This also removes the reliance on an external server which acted as a single point of failure across all connected systems previously.

The disclosure also contains multiple peripheral components that assist with alerting and control of operations. A camera is used to capture the patron that has alerted and to present evidence to the security guard to help with secondary screening. This assists the security guard in identifying the corresponding threat detection with the patron. Further, the system contains an alert indicator display that indicates an alert and shows the threat location on-body, as well as possibly the image of the alerting patron. There is also an audible signal to indicate an alert. These peripherals all work to enable the security guard to quickly take decisions on patrons entering the facility with prohibited items in high throughput use cases, such as stadiums or event venues.

These peripherals all work to enable the security guard to quickly take decisions on patrons entering the facility with prohibited items in high throughput use cases, such as stadiums or event venues. More information on further embodiments of a multi-sensor gateway is disclosed in U.S. Provisional application Ser. No. 18/093,937, entitled “SYSTEM AND METHOD SMART STAND-ALONE MULTI-SENSOR GATEWAY FOR DETECTION OF PERSON-BORNE THREATS”, filed on Jan. 6, 2023, the disclosure of which is incorporated herein by reference in its entirety.

According to FIG. 2, the system has onboard Wi-Fi®, as well as Ethernet, to connect to a web browser to provide more analytics to the user via a user interface. Furthermore, to enhance the stand-alone capability of the system, wheels are added for better portability. Also, a baseplate is added for better physical stability of the system against vibrations and tipping hazards.

To further help with control of operations, a display is placed on the patron side educating the patrons on how to walk through the system, and what distance to keep from the patron ahead. Furthermore, a backup option is provided for connecting the gateway system over Ethernet to the software platform for control and upgrades of the system algorithms and operations remotely.

Figure 3:
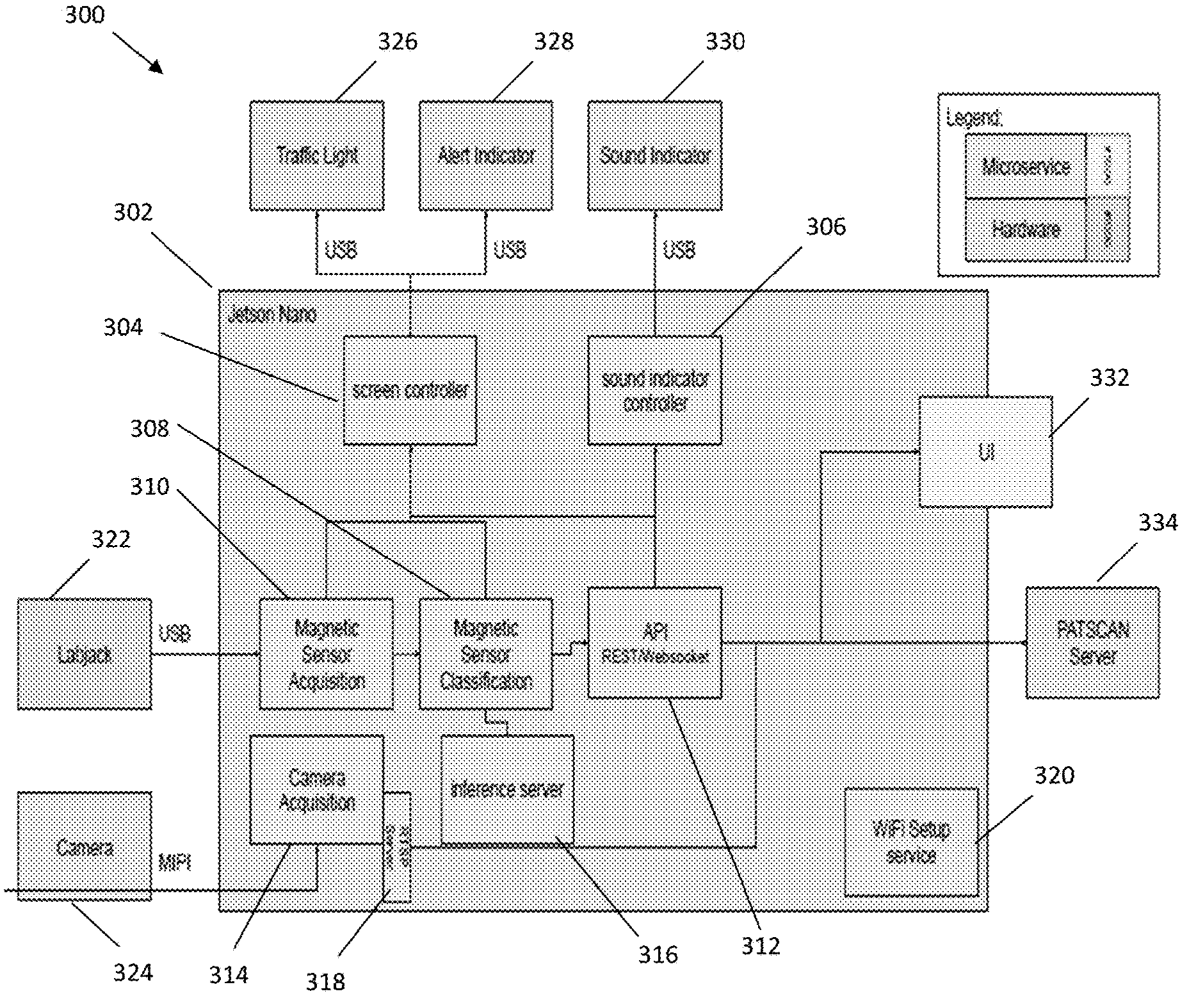
FIG. 3 is a hardware and software block diagram illustrating micro-services.

FIG. 3 is a hardware and software block diagram illustrating micro-services. According to FIG. 3, the onboard processor (e.g., Nvidia Jetson) includes such components as screen controller, sound indicator controller, magnetic sensor acquisition module, magnetic sensor classification module, REST/websockets API, camera acquisition module, inference server, RTSP server and a WiFi Setup service. The onboard processor is connected to input and outputs (via USB, Ethernet or wirelessly) including Labjack, cameras, traffic lights, alert indicators, sound indicators. Furthermore, the onboard processor is also connected to a user interface (UI) a gateway detection system such as a PATSCAN server.

FIG. 3 is a hardware and software block diagram illustrating micro-services. According to FIG. 3, system 300 has an onboard processor 302 (e.g., Nvidia Jetson) including such components as screen controller 304, sound indicator controller 306, magnetic sensor acquisition module 308, magnetic sensor classification module 310, REST/websockets API 312, camera acquisition module 314, inference server 316, RTSP server 318 and a Wi-Fi Setup service 320. The onboard processor is connected to input and outputs (via USB, Ethernet or wirelessly) including Labjack 322, cameras 324, traffic lights 326, alert indicators 328, sound indicators 330. Furthermore, the onboard processor is also connected to a user interface (UI) 332 and a gateway detection system such as a PATSCAN server 334.

According to FIG. 3, the onboard processor (e.g., Nvidia Jetson) utilizes a micro-services architecture. A breakdown of the micro-services architecture is as follows:

- Magnetic Sensor Acquisition Service: The classification service takes in data from a LabJack T7 via USB and formats it together for the classifier to use.
- Magnetic Sensor Classification Service: The classification service takes in data from acquisition and classifies the data using the inference server. It then sends the results.
- Inference Server Service: The Triton Inference Server is used by classification services to perform inference with AI models. Data is sent thru GRPC, and results are returned to the classifier.
- Screen Controller Service: Controls the traffic light and alert indicator based on information from acquisition and classifier, as well as user input from the API.
- Sound Indicator Controller Service: Controls the speakers based on information from acquisition and classifier, as well as user input from the API.
- Camera Acquisition Service: A Deepstream/gstreamer based service that takes in data from a CSI camera and re-transmits it for PATSCAN via RTSP and strips out JPEG frames and saves them to disk.
- API Service: A service that provides endpoints for control from the UI.

According to aspects of this disclosure, the latency of this disclosure is lower than earlier disclosures. Furthermore, this disclosure contains displays to control patron flow and indicate alert information such as location of threat on body.

The Multi-Sensor Gateway (MSG) system offered by Xtract One provides a means of screening venue patrons for various types of dangerous objects including guns, knives, batons, and other weapons. It consists of a pair of opposing gates, spaced approximately 1-2 metres apart, between which patrons are intended to pass through on an individual basis. Screening for dangerous objects is accomplished by a machine learning model that is provided input from various onboard sensors as patrons pass through the gates.

In order for the screening process to be effective, it is necessary for patrons to pass through the gates at a rate of no greater than approximately one patron every 1.5 seconds. When this requirement is contravened, screening performance is significantly inhibited. A physical queuing system to ensure adherence to operational protocols cannot, however, be put in place due to the potential of creating a negative patron experience during the initial entry into a venue.

Past experience in trial deployments has demonstrated that a means of verifying nominal system performance is necessary in order to identify deficiencies in operational processes. Initial efforts have approached this problem as a post-hoc analysis task and have been impactful in improving customer success outcomes.

Figure 4A:
FIGS. 4A to 4C are diagrams illustrating automated gate traversal plane identification and enhanced spatial awareness through the use of a stereo camera.
Figure 4B:
Figure 4C:
Figure 5A:
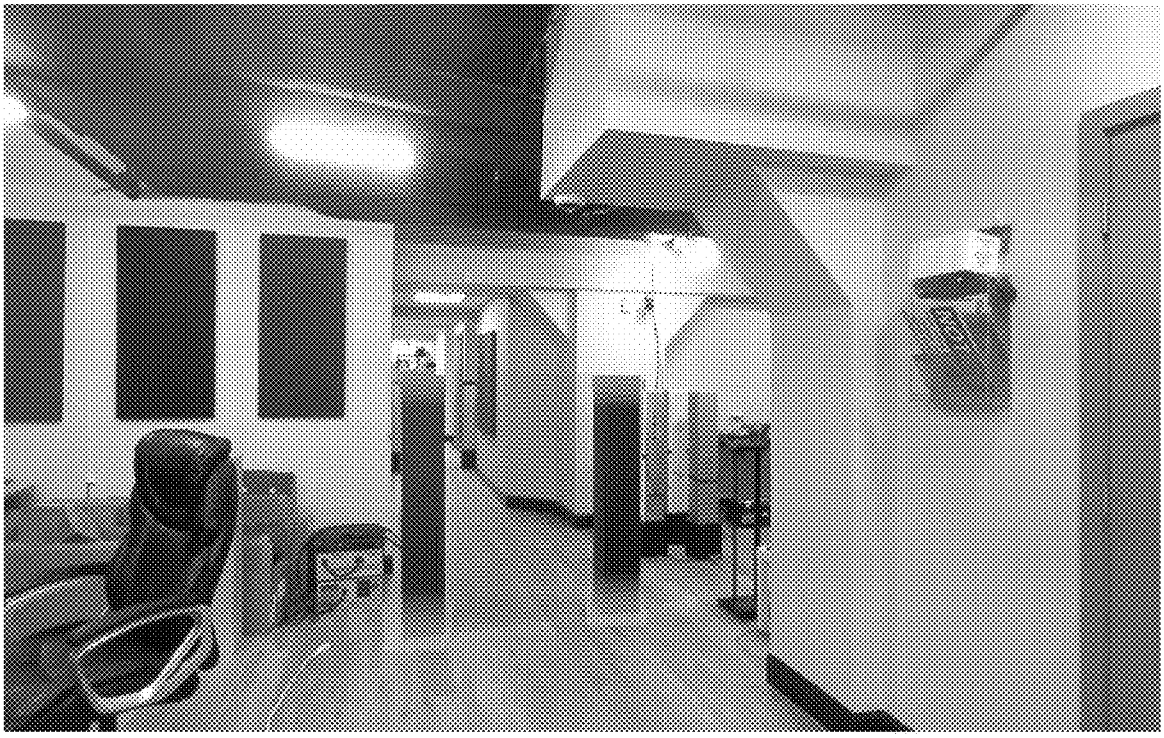
FIGS. 5A to 5D are diagrams illustrating inadequate spacing for gate traversal using a stereo camera.
Figure 5B:
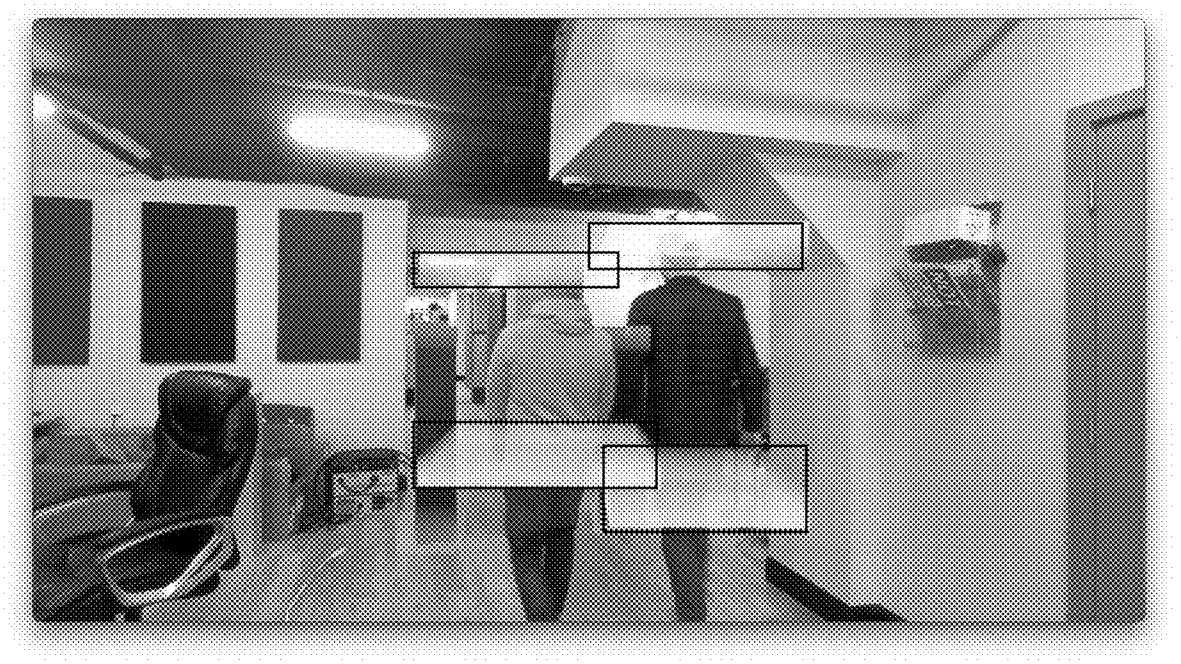
Figure 5C:
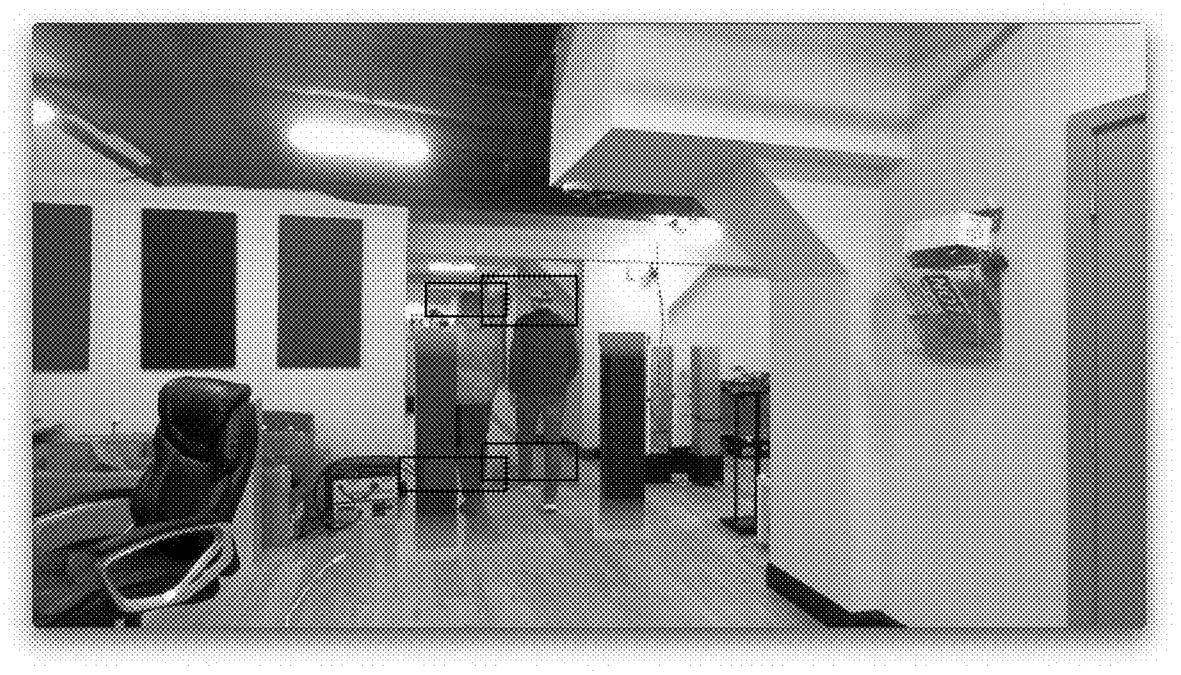
Figure 5D:
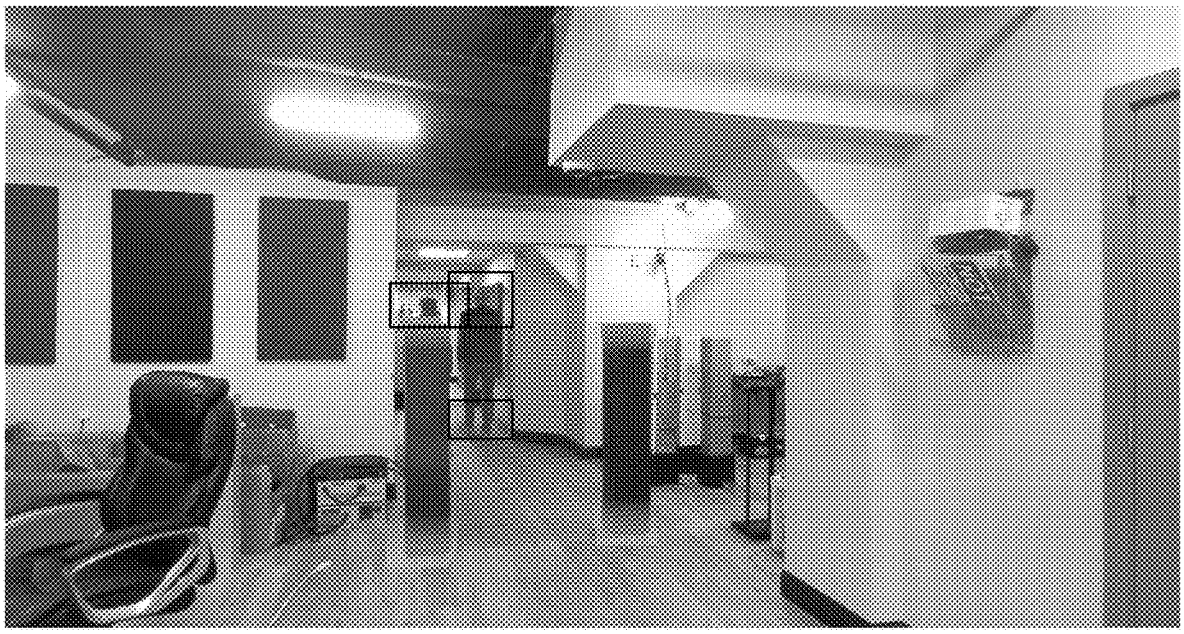

To address the limitations of previous efforts, a subsequent iteration has been undertaken that incorporates automated gate traversal plane identification as well as enhanced spatial awareness through the use of a stereo camera. FIGS. 4A to 4C are diagrams illustrating automated gate traversal plane identification and enhanced spatial awareness through the use of a stereo camera. The result of this effort demonstrates that identification of improper gate traversal can be done conveniently and with high quality, while also providing a compelling visual experience.

According to FIGS. 4A to 4C, a person is tracked through a staged scene. When the person is identified, a 3D bounding box is drawn with white coloring to indicate that the person has not yet been screened. When the person traverses through the MSG gates successfully, the bounding box color changes from white to green.

FIGS. 5A to 5D are diagrams illustrating inadequate spacing for gate traversal using a stereo camera. According to FIGS. 5A to 5D, these diagrams illustrate gate traversals where people are inadequately spaced and are indicated by a change in coloring from white to red.

Stereo Vision

Monocular vision is well-suited to many computer vision applications. However, for applications involving measurement of distance in 3D space, high fidelity scene depth information is required. To capture this information, stereo vision systems use a pair of horizontally displaced cameras combined with an image rectification process that merges the views of each camera into a single integrated view.

Figure 6:
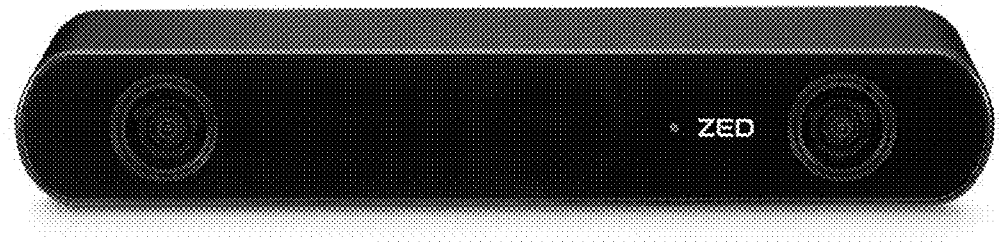
FIG. 6 is a diagram illustrating an exemplary stereo camera.

To provide stereo vision capabilities for this project, the ZED 2i camera from StereoLabs is used. FIG. 6 is a diagram illustrating an exemplary stereo camera such as the ZED camera. This camera is an affordable option for bringing spatial awareness to vision applications and provides a convenient SDK with language bindings for C++, Python, and C#. The usage of stereo vision within this project is novel with respect to previously existing Patriot One vision applications. In another embodiment, another stereo camera or multiple monocular cameras may be used in place of the ZED camera.

Automated Tower Detection

To enhance user experience and streamline application configuration, identification of MSG towers takes place automatically. This is accomplished using a standard 2D object detection model whose predictions are ingested by the ZED camera SDK and converted to 3D bounding boxes by an onboard hardware module. The model architecture chosen for this task is YOLOX. This architecture provides near state-of-the-art detection performance and scalable size options to suit a wide range of applications according to their speed/accuracy tradeoff needs.

FIG. 7 is a diagram illustrating an exemplary performance metrics dataset. According to FIG. 7, the dataset used to train this model consists of 394 images containing a total of 790 tower annotations. On a separate test set of 52 images with 108 tower annotations, the model gives the performance metrics as illustrated in FIG. 7. A training dataset of this size would not be adequate for real world applications. However, it is sufficient for this application as it is intended for demonstration purposes only.

Person Tracking

Figure 8:
FIG. 8 is a diagram illustrating a model for data tracking.

To enable visual gate traversal detection, it is necessary to both identify and track patrons moving through a scene. In this application, this pair of tasks is accomplished using ByteTrack. The source of the image of FIG. 8 is from the GitHub ByteTrack project [https://github.com/ifzhang/ByteTrack/]. FIG. 8 is a diagram illustrating a model for data tracking. According to FIG. 8, the model provides state-of-the-art performance in multi-object tracking and offers high performance suitable to real-time vision applications. The usage of statistical and control theory concepts enables ByteTrack to be successful in object tracking even when the objects temporarily become partially or fully occluded within a scene.

MSG Traversal Detection

Identification of gate traversal by a person is accomplished using a distance-based approach that is enabled by the spatial awareness capabilities of the stereo camera. A person is deemed to have traversed the gates if the geometric center (centroid) of their detected 3D bounding box is measured to be less than 35 cm from the closest point of the gate traversal plane.

Figure 9:
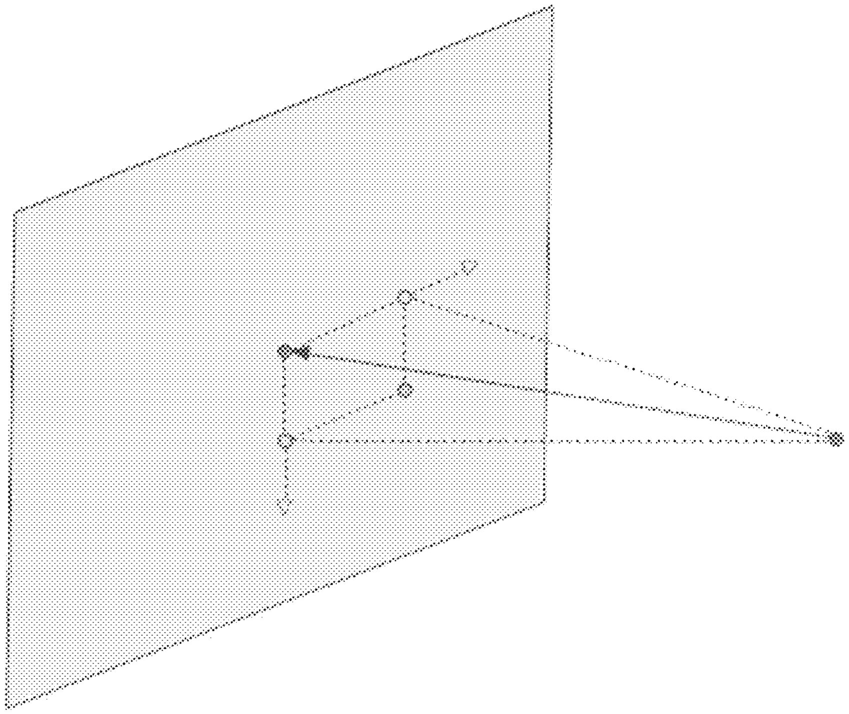
FIG. 9 is a diagram illustrating traversal detection using vectors.

FIG. 9 is a diagram illustrating traversal detection using vectors. According to FIG. 9, determining the closest point on the gate traversal plane to a point in 3D space is accomplished through a geometric process requiring the traversal plane to be represented by its centroid as well as a pair of vectors representing the orientation of its x and y axes. A vector D representing the space between the traversal plane's centroid and a point in 3D space is computed, and the distance along the vectors representing the traversal plane's x and y axes is determined by projecting vector D onto these vectors.

According to FIG. 9, the closest point on the traversal plane to the point is given by combining these distances from the traversal plane's centroid. Determining that the protocol requiring approximately 1.5 seconds to elapse between traversals has been contravened is simulated in this application by identifying any people whose bounding box centroid is within a distance of 75 cm from a person traversing the gates. A more sophisticated approach considering the temporal aspect of gate traversal should be considered as a further enhancement.

According to this disclosure, a differentiator between this disclosure and previous efforts is the usage of a stereo camera system to enable accurate determination of spatial positioning of key objects of interest.

According to this disclosure, visualization of 3-dimensional bounding boxes combined with detection of objects of interest passing through an automatically identified traversal plane would be cues that a competitor is using the invention.

According to this disclosure, determination of the spatial positioning of an object of interest is accomplished by combining the output of two or more mono cameras together as a single view and identifying positioning within that view.

According to the disclosure, a multi-sensor gateway system for visual detection of patrons passing through is disclosed. The system comprises a first pillar having a plurality of first sensors, a second pillar having a plurality of second sensors, a stereo camera contained within the first or second pillar, a Wi-Fi® module on the first pillar configured for the pillars to communicate over Wi-Fi®, a platform computer server and processor configured to receive data and process the data, a display screen displaying output data on a user interface (UI). The processor is configured to run one or more micro-services to process the data from the stereo camera and the patron is identified and tracked through passage through the multi-sensor gateway system. Furthermore, a bounding box is drawn on the UI display screen to identify the patron and changes colour as the patron traverses the multi-sensor gateway system.

According to the disclosure, a successful traversal of the system is indicated by colour change from white to green. An unsuccessful traversal of the system is indicated by colour change from white to red and indication that people are inadequately spaced.

According to the disclosure, the micro-services is selected from a list consisting of a magnetic sensor acquisition service, a magnetic sensor classification service, an inference server service, a screen controller service, a sound indicator controller service, a camera acquisition service and an API service. The magnetic sensor acquisition service of the system is configured to receive data from the processor. The magnetic sensor classification service of the system is configured to receive data from the magnetic sensor acquisition service and classifies the data using an inference server. The inference server service of the system is configured to be used by the inference server to perform inference with AI models.

According to the disclosure, the screen controller service of the system is configured to control traffic light and alert indicators. The sound indicator controller service of the system configured to control the speakers based on information from acquisition and classifier, as well as user input. The camera acquisition service of the system configured to receive data from a stereo camera, process the data and re-transmits it to the multi-sensor gateway. The API service of the system is configured to provide endpoints for control from the user interface.

According to the disclosure, the system further uses artificial intelligence (AI) to analyze the sensors' data and assess the presence of a threat wherein the AI is performed on an edge device contained within the gateway. According to the disclosure, the output of system further comprises sending audible alerts and notification alerts to security personnel According to the disclosure, a method of visual detection of patrons passing through a multi-sensor gateway system is disclosed. The method comprising the steps of providing a first pillar having a plurality of first sensors, providing a second pillar having a plurality of second sensors, providing a stereo camera on the first or second pillar, providing a Wi-Fi® module on the first pillar configured for the pillars to communicate over Wi-Fi®, providing a display screen displaying a user interface (UI), providing a platform computer server and processor configured to receive data and process the data, capturing one or more images of the patron with the stereo camera, tracking the movement of the patron as they traverse through the first and second pillars of the multi-sensor gateway, computing the data using the platform computer server and processor and processing the data, displaying a bounding box on the UI display screen to identify the patron and changing the colour of the bounding box on the UI display as the patron traverses the multi-sensor gateway system.

According to the disclosure, the method further comprising the step of transmitting the data to operations and to security personnel. According to the disclosure, a successful traversal of the method is indicated by colour change from white to green. An unsuccessful traversal is indicated by colour change from white to red and indication that people are inadequately spaced.

According to the disclosure, the processor of the method is configured to run one or more micro-services to process the data from the stereo camera. The micro-services selected from a list consisting of a magnetic sensor acquisition service, a magnetic sensor classification service, an inference server service, a screen controller service, a sound indicator controller service, a camera acquisition service and an API service.

According to the disclosure, the system the magnetic sensor acquisition service of the method is configured to receive data from the processor. The magnetic sensor classification service of the method is configured to receive data from the magnetic sensor acquisition service and classifies the data using an inference server. The inference server service of the method configured to be used by the inference server to perform inference with AI models.

According to the disclosure, the system, the screen controller service of the method is configured to control traffic light and alert indicators. The sound indicator controller service of the method is configured to control the speakers based on information from acquisition and classifier, as well as user input. The camera acquisition service of the method configured to receive data from a stereo camera, process the data and re-transmits it to the multi-sensor gateway and the API service of the method configured to provide endpoints for control from the user interface.

According to the disclosure, the method further comprises sending audible alerts and notification alerts to operations or to a security personnel. The method further comprises the use of artificial intelligence (AI) to analyze the sensors' data and assess the presence of a threat wherein the AI is performed on an edge device contained within the gateway.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A multi-sensor gateway system for visual detection of patrons passing through, the system comprising:
- a first pillar having a plurality of first sensors;
- a second pillar having a plurality of second sensors;
- a stereo camera positioned to capture image data of a passage region between the pillars;
- a display screen configured to present a user interface (UI); and
- a processor configured to:
  - receive stereo image data from the stereo camera;
  - identify a patron in the stereo image data and generate a three-dimensional bounding box for the patron;
  - automatically identify a gate traversal plane between the first and second pillars;
  - determine a closest point on the gate traversal plane to a geometric center of the three-dimensional bounding box;
  - classify the patron as having successfully traversed the multi-sensor gateway when the geometric center of the three-dimensional bounding box is less than 35 cm from the closest point on the gate traversal plane;
  - determine inadequate spacing by identifying another person whose three-dimensional bounding-box centroid is within 75 cm of a person traversing the gate traversal plane; and
  - display the three-dimensional bounding box on the user interface with a first color before traversal, a second color for successful traversal, and a third color for inadequate spacing.

2. The system of claim 1, wherein the stereo camera comprises a pair of horizontally displaced cameras and an image-rectification process that merges views into a single integrated view.

3. The system of claim 1, wherein the first color is white, the second color is green, and the third color is red.

4. The system of claim 1, wherein the processor is configured to represent the traversal plane by a centroid and a pair of vectors representing x- and y-axis orientation of the traversal plane.

5. The system of claim 1, wherein the processor determines the closest point on the traversal plane by projecting a vector between the traversal-plane centroid and a point in 3D space onto the traversal-plane vectors.

6. The system of claim 1, wherein the processor includes an onboard edge processor that performs artificial-intelligence processing for threat detection.

7. The system of claim 1, wherein the processor runs one or more micro-services including a camera acquisition service, an inference server service, a screen controller service, a sound indicator controller service, and an API service.

8. The system of claim 7, wherein the camera acquisition service retransmits camera data and the API service provides endpoints for control from the user interface.

9. A method of visual detection of patrons passing through a multi-sensor gateway system having first and second pillars, the method comprising the steps of:
- capturing stereo image data of a passage region between the pillars;
- identifying a patron in the stereo image data and generating a three-dimensional bounding box for the patron;
- automatically identifying a gate traversal plane between the pillars;
- determining a closest point on the gate traversal plane to a geometric center of the three-dimensional bounding box;
- classifying the patron as having successfully traversed the gateway when the geometric center of the three-dimensional bounding box is less than 35 cm from the closest point on the gate traversal plane;
- determining inadequate spacing by identifying another person whose bounding-box centroid is within 75 cm of a person traversing the gate traversal plane; and
- displaying the three-dimensional bounding box on a user interface in a first color before traversal, a second color for successful traversal, and a third color for inadequate spacing.

10. The method of claim 9, wherein the first color is white, the second color is green, and the third color is red.

11. The method of claim 9, wherein the stereo image data is generated from a pair of horizontally displaced cameras.

12. The method of claim 9, further comprising transmitting alert information to operations or security personnel.

* * * * *